United States Patent
Kim et al.

(10) Patent No.: US 7,518,411 B2
(45) Date of Patent: Apr. 14, 2009

(54) DATA RECEIVING APPARATUS USING SEMI-DUAL REFERENCE VOLTAGE

(75) Inventors: Yang-ki Kim, Seoul (KR); Young-jin Jeon, Daejeon (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 142 days.

(21) Appl. No.: 11/747,685

(22) Filed: May 11, 2007

(65) Prior Publication Data

US 2008/0042690 A1   Feb. 21, 2008

(51) Int. Cl.
   *G01R 19/00* (2006.01)
(52) U.S. Cl. .............................. 327/52; 327/56; 327/57; 327/77
(58) Field of Classification Search .................. 327/51, 327/52, 55–57
   See application file for complete search history.

(56) References Cited

U.S. PATENT DOCUMENTS

| | | | |
|---|---|---|---|
| 6,476,645 B1* | 11/2002 | Barnes | 327/51 |
| 6,707,321 B2* | 3/2004 | Cho et al. | 327/51 |
| 6,864,725 B2* | 3/2005 | Cowles et al. | 327/108 |
| 7,366,041 B2* | 4/2008 | Pan et al. | 365/194 |
| 2003/0210078 A1* | 11/2003 | Wijetunga et al. | 327/52 |
| 2005/0162193 A1* | 7/2005 | Payne et al. | 327/52 |

FOREIGN PATENT DOCUMENTS

| | | |
|---|---|---|
| KR | 1020030006950 A | 1/2003 |
| KR | 1020030037069 A | 5/2003 |
| KR | 1020040023837 A | 3/2004 |

* cited by examiner

*Primary Examiner*—Tuan T Lam
(74) *Attorney, Agent, or Firm*—F. Chau & Associates, LLC

(57) ABSTRACT

A semi-dual reference voltage data receiving apparatus includes a first input buffer, a second input buffer, and a phase detector wherein the first input buffer includes a first input receiving unit, a first sense amplifier, and a first current offset controlling unit. The first sense amplifier senses and amplifies the voltage difference between the voltage of a first terminal of a first input transistor and the voltage of a first terminal of a second input transistor. The first current offset controlling unit controls the offset of the current that flows through the second terminal of the second input transistor.

26 Claims, 8 Drawing Sheets

DATA RECEIVING APPARATUS USING SEMI-DUAL REFERENCE VOLTAGE

CROSS-REFERENCE TO RELATED PATENT APPLICATION

This application claims the benefit of Korean Patent Application No. 10-2006-0075325, filed on Aug. 9, 2006, in the Korean Intellectual Property Office, the disclosure of which is incorporated herein in its entirety by reference.

BACKGROUND OF THE INVENTION

1. Technical Field

The present disclosure relates to a semiconductor apparatus and, more particularly, to an apparatus that receives data transmitted through a single transmission line by differential signaling using a single reference voltage.

2. Discussion of Related Art

Semiconductor devices send and receive data signals to and from one another in a system and are required to determine whether the received data signals are logic high or logic low. Thus, the semiconductor devices include a receiver or receiving apparatus that receives data signals and determines whether the received data signals are logic high or logic low.

Semiconductor devices can send and receive data signals using differential signaling or single-ended signaling.

FIG. 1 is a waveform of a data signal generated by single-ended signaling. In single-ended signaling, semiconductor devices are connected with a single data transmission line and data signals DATA are transmitted through the single transmission line.

Single-ended signaling reduces the required number of pins of semiconductor devices but is susceptible to common mode noise compared to differential signaling and has half the input data eye W1 compared to differential signaling.

FIG. 2 is a waveform of data signals generated by differential signaling. In differential signaling, semiconductor devices are connected with two data transmission lines and data signals DATA and inversion data signals /DATA are transmitted through the two data transmission lines.

Differential signaling has superior tolerance to common mode noise compared to single-ended signaling and input data eyes W2 are twice as big as in single-ended signaling. Differential signaling, however, increases the required number of pins of semiconductor devices since two signals, that is, DATA and /DATA are transmitted simultaneously.

Generally, it is required to transmit as much data as possible using a minimum number of transmission lines and expand the input data eye at the same time, so as to reduce system manufacturing costs and to improve system performance.

Thus, a receiving method using a dual reference voltage has been suggested. In the receiving method using a dual reference voltage, data signals are transmitted through a single transmission line as in single-ended signaling, and a receiving apparatus receives data signals by differential signaling using a dual reference voltage.

FIG. 3 is a block diagram illustrating a dual reference voltage receiving apparatus 300. Referring to FIG. 3, the dual reference voltage receiving apparatus 300 includes a first input buffer 310, a second input buffer 330, and a phase detector 350.

The first input buffer 310 is synchronized to a clock signal CLK and is enabled or disabled in response to the clock signal CLK. The first input buffer 310 senses and amplifies the voltage difference between a data signal DATA that is input to a positive + input terminal of the first input buffer 310 and a first reference voltage VREFH that is input to a negative − input terminal of the first input buffer 310, and outputs a first selection signal SEL1.

The second input buffer 330 is synchronized to the clock signal CLK and is enabled or disabled in response to the clock signal CLK. The second input buffer 330 senses and amplifies the voltage difference between a second reference voltage VREFL that is input to a positive + input terminal of the second input buffer 330 and the data signal DATA that is input to a negative input terminal − of the second input buffer 330 and outputs a second selection signal SEL2.

The phase detector 350 detects the phase difference between the first selection signal SEL1 and the second selection signal SEL2 and generates an output signal DI that corresponds to the detected phase difference.

Here, the first reference voltage VREFH is higher than the median level of the data signal DATA, and the second reference voltage VREFL is lower than the median level of the data signal DATA. A voltage that is generated inside the semiconductor device or a power supply voltage VDD can be used for the first reference voltage VREFH, and a voltage that is generated inside the semiconductor device or a ground voltage VSS can be used for the second reference voltage VREFL.

The case when a voltage higher than the median level of the data signal DATA is used as the first reference voltage VREFH, and a voltage that is lower than the median level of the data signal DATA is used as the second reference voltage VREFL is explained below.

FIG. 4 is a circuit diagram of the dual reference voltage receiving apparatus 300 of FIG. 3. FIG. 5 is an exemplary waveform of the data signal DATA in the dual reference voltage receiving apparatus 300, and FIG. 6 is another exemplary waveform of the data signal DATA in the dual reference voltage receiving apparatus 300.

Referring to the signal waveforms in FIGS. 5 and 6, the low data portion of the data signal DATA has the largest voltage difference with respect to the first reference voltage VREFH, and the high data signal portion of the data signal DATA has the largest voltage difference with respect to the second reference voltage VREFL. Therefore, the first input buffer 310 is used for detecting the low data portion of the data signal DATA, and the data signal DATA is compared with the first reference voltage VREFH. The second input buffer 330 is used for detecting the high data signal portion of the data signal DATA, and the data signal DATA is compared with the second reference voltage VREFL.

Because the dual reference voltage apparatus 300 uses two reference voltages, that is, the first and second reference voltages VREFH and VREFL, the dual reference voltage receiving apparatus 300 has relatively complex circuitry and is susceptible to noise during high-speed transmission when compared to a receiving apparatus using single-ended or differential signaling.

SUMMARY OF THE INVENTION

Exemplary embodiments of the present invention provide a data receiving apparatus that receives data that is transmitted through a single transmission line by differential signaling using a single reference voltage.

According to an exemplary embodiment of the present invention, there is provided a receiving apparatus comprising: a first input buffer that senses and amplifies the voltage difference between a data signal that is input through a positive input terminal and a reference voltage that is input through a negative input terminal; a second input buffer that senses and amplifies the voltage difference between the reference voltage that is also input through the positive input terminal and the data signal that is also input through the negative input terminal; and a phase detector that detects the phase difference between first and second selection signals that are respectively output from the first input buffer and the second input buffer, and the first input buffer comprises: a first input receiving unit, a first sense amplifier, and a first current offset controlling unit. The first input receiving unit comprises a first input transistor and a second input transistor, wherein the data signal is applied to the gate of the first input transistor and the reference voltage is applied to the gate of the second input transistor. The first sense amplifier senses and amplifies the voltage difference between the voltage of a first terminal of the first input transistor and the voltage of a first terminal of the second input transistor. The first current offset controlling unit controls the offset of the electric current that flows through a second terminal of the second input transistor, wherein the gate of the first input transistor is a positive input terminal of the first input buffer and the gate of the second input transistor is a negative input terminal of the first input buffer.

The first current offset controlling unit may be a first current source that supplies a predetermined offset current to the second terminal of the second input transistor, where the first current source may be connected in parallel to the second input transistor.

The first sense amplifier can be a cross-coupled sense amplifier. The first current source may be connected to a gate of a transistor of the cross-coupled sense amplifier, which is connected to the first input transistor, and to the second terminal of the second input transistor.

The reference voltage may he the median level of the data signal.

The first input buffer can further comprise a first controlling unit that enables or disables the first input receiving unit and the first sense amplifier in response to a clock signal.

The second input buffer comprises a second input receiving unit, a second sense amplifier, and a second current offset controlling unit. The second input receiving unit comprises a third transistor and a fourth input transistor, wherein the reference voltage is applied to the gate of the third transistor and the data signal is applied to the gate of the fourth input transistor. The second sense amplifier senses and amplifies the voltage difference between the voltage of a first terminal of the third input transistor and the voltage of a first terminal of the fourth input transistor. The second current offset controlling unit controls the offset of electric current that flows to the third input transistor, wherein the gate of the third input transistor is a positive input terminal of the second input buffer and the gate of the fourth input transistor is a negative input terminal of the second input buffer.

The second current offset controlling unit may be a second current source that supplies a minus offset current of the offset current to a second terminal of the third input transistor. The second current source may be connected in parallel to the third input transistor.

The second sense amplifier may be a cross-coupled sense amplifier. The second current source may be connected to a gate of a transistor of the cross-coupled sense amplifier, which is connected to the fourth input transistor and to the second terminal of the third input transistor.

The second input buffer can comprise a second controlling unit that enables or disables the second input receiving unit and the second sense amplifier in response to a clock signal.

According to an exemplary embodiment of the present invention, there is provided a receiving apparatus comprising:

a first input buffer that senses and amplifies the voltage difference between a data signal that is input through a positive input terminal and a reference voltage that is input through a negative input terminal; a second input buffer that senses and amplifies the voltage difference between the reference voltage that is also input to the positive input terminal and the data signal that is also input to the negative terminal; and a phase detector that detects the phase difference between first and the second selection signals that are output from the first input buffer and the second input buffer, respectively, and the first input buffer comprises: a first input receiving unit that comprises a first input transistor and a second input transistor, wherein the data signal is applied to the gate of the first input transistor and the reference voltage is applied to the gate of the second input transistor; a first sense amplifier that senses and amplifies the voltage difference between the voltage of a first terminal of the first input transistor and the voltage of a first terminal of the second input transistor; and a first current offset controlling unit that controls the offset of the electric current that flows through a second terminal of the first input transistor, wherein the gate of the first input transistor is the positive input terminal of the first input buffer and the gate of the second input transistor is the negative input terminal of the first input buffer.

The first current offset controlling unit may be a first resistor that inhibits the electric current flowing through the second terminal of the first input transistor.

The first resistor may be connected in series to one terminal of the first input transistor or to the other terminal of the first input transistor.

The first sense amplifier may be a cross-coupled sense amplifier.

The reference voltage may be the median level of the data signal.

The first input buffer can further comprise a first controlling unit that enables or disables the first input receiving unit and the first sense amplifier in response to a clock signal.

According to an exemplary embodiment of the present invention, there is provided a receiving apparatus, wherein the second input buffer comprises: a second input unit, a second sense amplifier, and a second current offset controlling unit. The second input receiving unit comprises a third input transistor and a fourth input transistor, wherein the reference voltage is applied to the gate of the third input transistor and the data signal is applied to the gate of fourth input transistor. The second sense amplifier senses and amplifies the voltage difference between the voltage of a first terminal of the third input transistor and the voltage of a first terminal of the fourth input transistor. The second current offset controlling unit controls the offset of the electric current that flows to the third input transistor, wherein the gate of the third input transistor is the positive input terminal of the second input buffer and the gate of the fourth input transistor is the negative input terminal of the second input buffer.

The second current offset controlling unit may be a second resistor that inhibits the electric current flowing through the second terminal of the third input transistor. The second resistor may be connected in series to one terminal of the third input transistor or to the other terminal of the third input transistor.

The second sense amplifier may be a cross-coupled sense amplifier.

The second input buffer can further comprise a second controlling unit that enables or disables the second input receiving unit and the second sense amplifier in response to a clock signal.

BRIEF DESCRIPTION OF THE DRAWINGS

Exemplary embodiments of the present invention will be understood in more detail from the following descriptions taken in conjunction with the attached drawings in which.

DETAILED DESCRIPTION OF EXEMPLARY EMBODIMENTS

Hereinafter, the present invention will now be described more fully with reference to the accompanying drawings, in which exemplary embodiments of the invention are shown.

Figure 1:
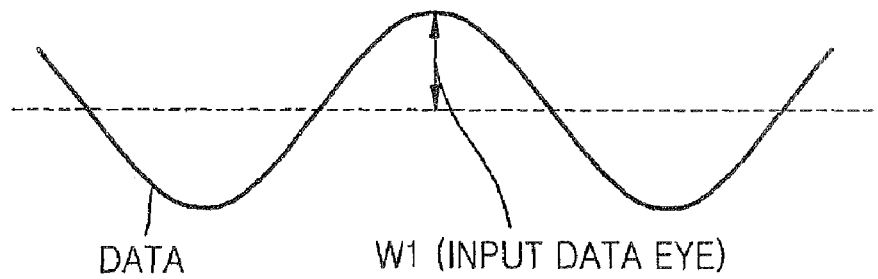
FIG. 1 is a waveform of a signal generated by single-ended signaling.
Figure 2:
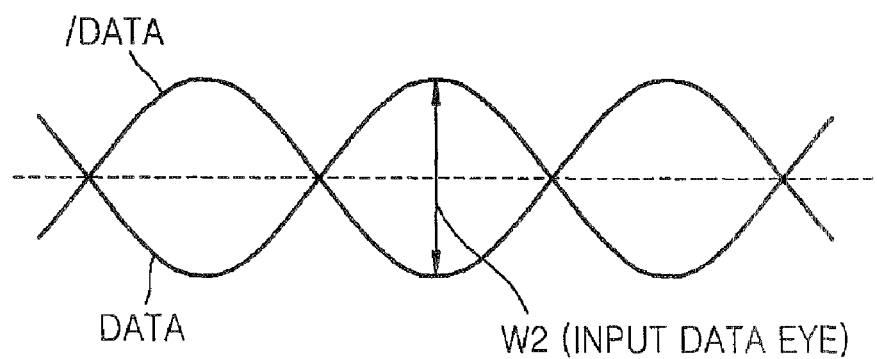
FIG. 2 is a waveform of a signal generated by differential signaling.
Figure 3:
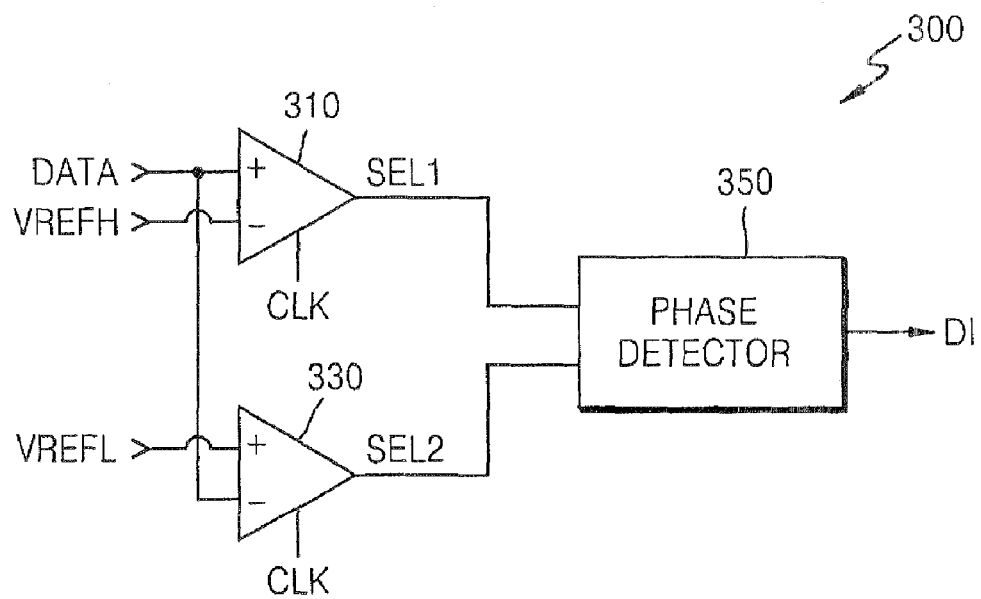
FIG. 3 is a block diagram illustrating a dual reference voltage receiving apparatus.
Figure 4:
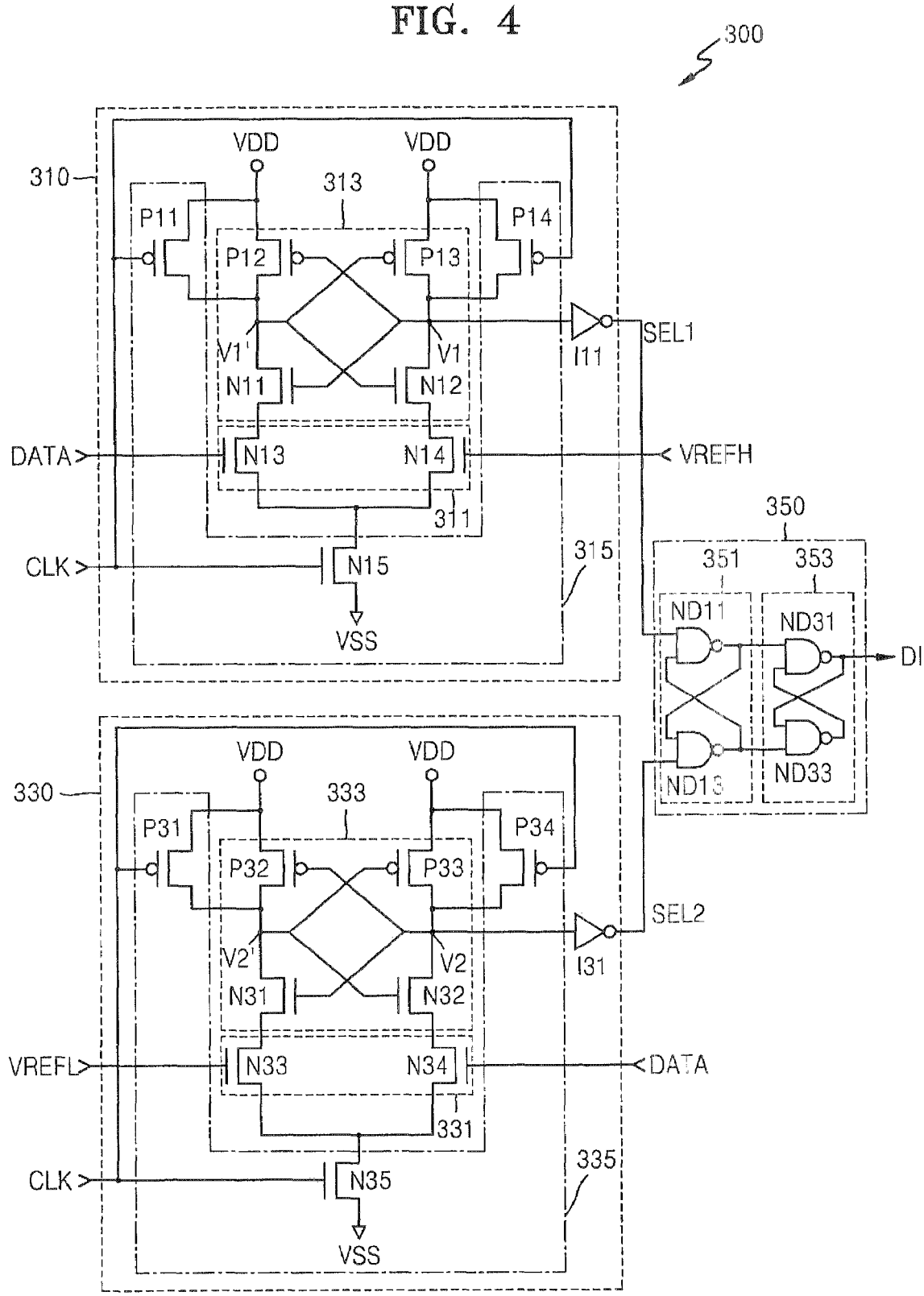
FIG. 4 is a circuit diagram of the dual reference voltage receiving apparatus of FIG. 3.
Figure 5:
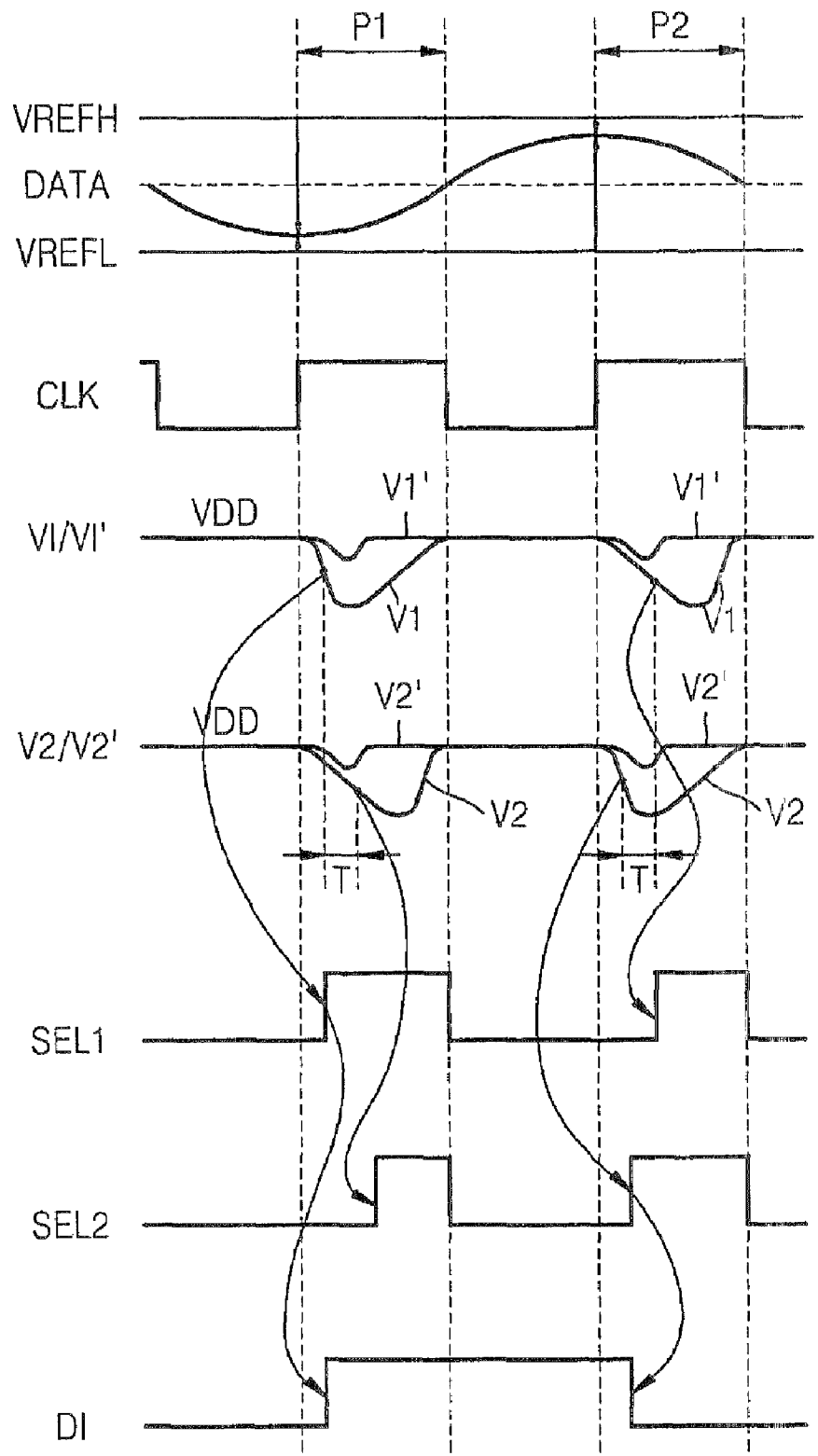
FIG. 5 illustrates waveforms of signals in the dual reference voltage receiving apparatus of FIG. 4.
Figure 6:
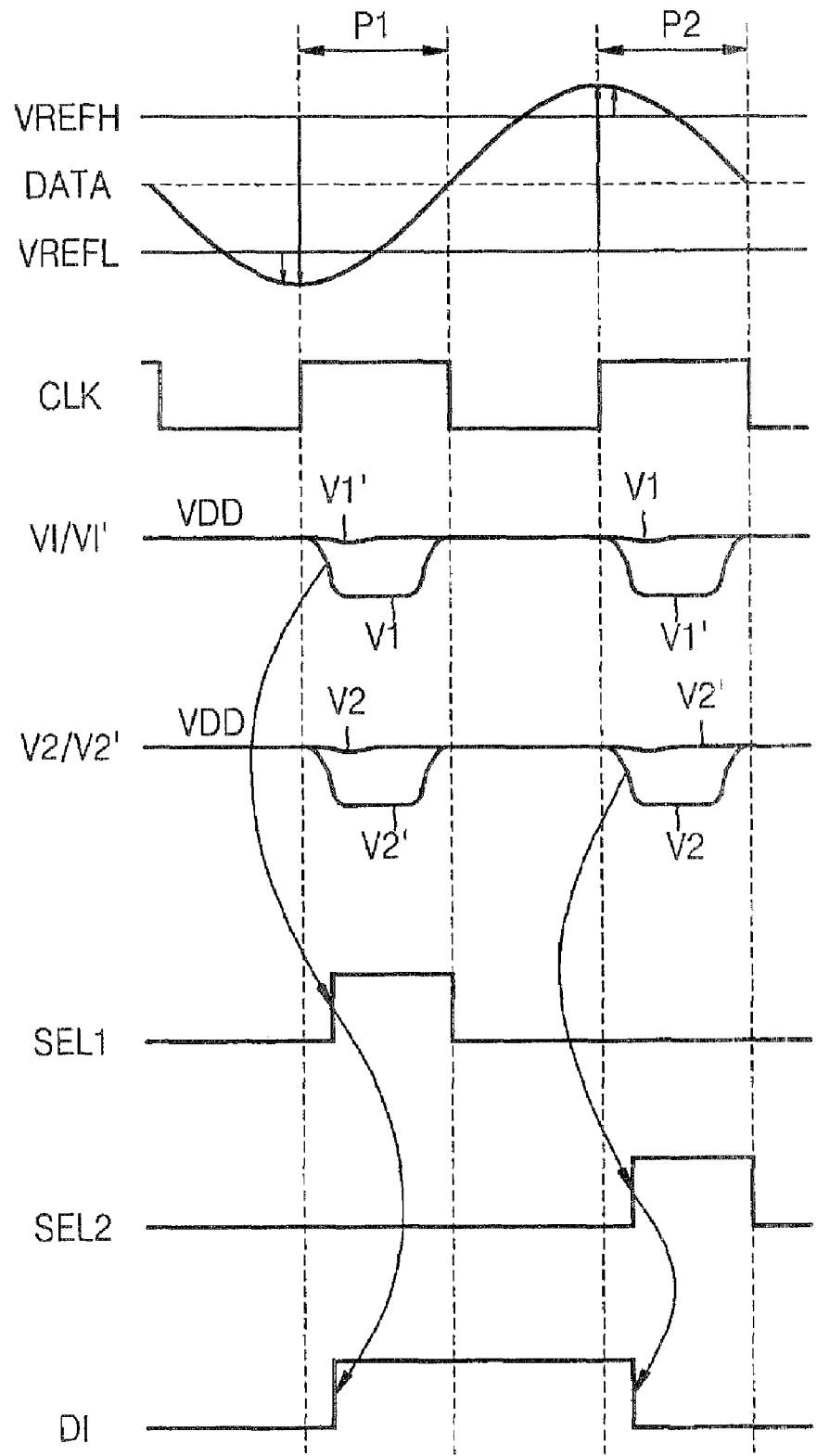
FIG. 6 illustrates more waveforms of signals in the dual reference voltage receiving apparatus of FIG. 4.

Referring to FIGS. 4 through 6, operation of a dual reference voltage receiving apparatus 300 of FIG. 3 is explained to better understand a semi-dual receiving apparatus according to an exemplary embodiment of the present invention. FIG. 4 is a circuit diagram of the dual reference voltage receiving apparatus 300 of FIG. 3.

A first input buffer 310 is formed as a cross-coupled sense amplifier, and includes an input receiving unit 311, a sense amplifying unit 313, a controlling unit 315, and an inverting buffer I11.

The input receiving unit 311 includes a first input transistor N13 and a second input transistor N14. A data signal DATA is applied to the gate of the first input transistor N13 and a first reference voltage VREFH is applied to the gate of the second input transistor N14. The gate of the first input transistor N13 corresponds to a positive input terminal of the first input buffer 310 of FIG. 3, and the gate of the second input transistor N14 corresponds to a negative input terminal of the first input buffer 310 of FIG. 3. The first input transistor N13 and the second input transistor N14 are formed as NMOS transistors.

The sense amplifying unit 313 is connected to a first terminal of the first input transistor N13 and to a first terminal of the second input transistor N14, and senses and amplifies the voltage differences between the voltage of the first terminal of the first input transistor N13 and the voltage of the first terminal of the second input transistor N14. The sense amplifying unit 313 includes two PMOS transistors P12 and P13 that are cross-coupled and two NMOS transistors N11 and N12 that are cross-coupled.

The controlling unit 315 includes an NMOS transistor N15 that is connected between a common node of the first input transistor N13 and the second input transistor N14 and a ground voltage source VSS, and is controlled by a clock signal CLK; a PMOS transistor P14 that is connected between a power supply VDD and a node from which an inner output signal V1 is output, and is controlled by the clock signal CLK; and a PMOS transistor P11 that is connected between the power supply VDD and a node from which a complementary signal V1' of the inner output signal V1 is output, and is controlled by the clock signal CLK.

When the clock signal CLK is logic high, the NMOS transistor N15 is turned on, and the PMOS transistors P14 and P11 are turned off. Accordingly, the input receiving unit 311 and the sense amplifying unit 313 are enabled and perform normal operations. When the clock signal CLK is logic low, the NMOS transistor N15 is turned off, and the PMOS transistors P14 and P11 are turned on. Accordingly, the input receiving unit 311 and the sense amplifying unit 313 are disabled and do not operate, and the voltages of the node from which the inner output signal V1 is output and the node from which the complementary signal V1' of the inner output signal V1 is output become the voltage of the power supply VDD.

The inverting buffer I11 inverts and buffers the inner output signal V1 and outputs an output signal SEL1.

A second input buffer 330 is also formed as a cross-coupled sense amplifier like the first input buffer 310 and includes an input receiving unit 331, a sense amplifying unit 333, a controlling unit 335, and an inverting buffer I31.

The input receiving unit 331 includes a first input transistor N33 and a second input transistor N34. A second reference voltage VREFL is applied to the gate of the first input transistor N33 and the data signal DATA is applied to the gate of the second input transistor N34. The gate of the first input transistor N33 corresponds to a positive input terminal of the second input buffer 330 of FIG. 3, and the gate of the second input transistor N34 corresponds to a negative input terminal of the second input buffer 330 of FIG. 3. The first input transistor N33 and the second input transistor N34 are formed as NMOS transistors.

The sense amplifying unit 333 is connected to a first terminal of the first input transistor N33 and to a first terminal of the second input transistor N34, and senses and amplifies the voltage difference between the voltage of the first terminal of the first input transistor N33 and the voltage of the first terminal of the second input transistor N34. The sense amplifying unit 333 includes two PMOS transistors P32 and P33 that are cross-coupled and two NMOS transistors N31 and N32 that are cross-coupled.

The controlling unit 335 includes an NMOS transistor N35 that is connected between a common node of the first input transistor N33 and the second input transistor N34 and the ground voltage source VSS, and is controlled by the clock signal CLK; a PMOS transistor P34 that is connected between the power supply VDD and a node from which an inner output signal V2 is output, and controlled by the clock signal CLK; and a PMOS transistor P31 that is connected between the power supply VDD and a node from which a complementary signal V2' of the inner output signal V2 is output, and controlled by the clock signal CLK.

When the clock signal CLK is logic high, the NMOS transistor N35 is turned on, and the PMOS transistors P34 and P31 are turned off. Accordingly, the input receiving unit 331 and the sense amplifying unit 333 are enabled and operate normally. When the CLK is logic low, the NMOS transistor N35 is turned off, and the PMOS transistors P34 and P31 are turned on. Accordingly, the input receiving unit 331 and the sense amplifying unit 333 are disabled and do not operate, and the voltages of the node from which the inner output signal V2 is output and the node from which the complementary signal V2' of the inner output signal V2 is output become the voltage of the power supply VDD.

The inverting buffer I31 inverts and buffers the inner output signal V2, and outputs an output signal SEL2.

The second input buffer 330 has the same structure as the first input buffer 310. The data signal DATA, however, is input to the gate of the NMOS transistor N13 that corresponds to the positive + input terminal of the first input buffer 310, whereas the data signal DATA is input to the gate of the NMOS transistor N34 that corresponds to the negative – input terminal of the second input buffer 330. Also, the first reference voltage VREFH is input to the gate of the NMOS transistor N14 that corresponds to the negative – input terminal of the first input buffer 310, whereas the second reference voltage VREFL is input to the gate of the NMOS transistor N33 that corresponds to the positive + input terminal of the second input buffer 330.

The phase detector 350 includes a first latch circuit 351 that is a set-reset SR switch and latches the first selection signal SEL1 output from the first input buffer 310 and the second selection signal SEL2 output from the second input buffer 330; and a second latch circuit 353 that is an SR switch and latches the two output signals from the first latch circuit 351. The output signal DI that corresponds to the phase difference between the first selection signal SEL1 and the second selection signal SEL2 is output from the second latch circuit 353. The first latch circuit 351 includes two NAND gates ND11, ND13, and the second latch circuit 353 also includes two NAND gates ND31, ND33.

Although it is shown that the first input buffer 310 and the second input buffer 330 are synchronized and controlled by the clock signal CLK, in FIG. 4, it is understood by those of ordinary skill in the art that the first input buffer 310 and the second input buffer 330 may not be synchronized or controlled by the clock signal CLK.

Also, the first input buffer 310 and the second input buffer 330 are formed as cross-coupled sense amplifiers in the dual reference voltage receiving apparatus 300 of FIG. 4, but it is understood by those of ordinary skill in the art that the first input buffer 310 and the second input buffer 330 can have various forms.

In addition, the phase detector 350 is formed in an SR latch form in the dual reference voltage receiving apparatus 300 of FIG. 4, but it is understood by those of ordinary skill in the art that the phase detector 350 can have various forms.

FIGS. 5 and 6 illustrate waveforms of each signal of the dual reference voltage receiving apparatus 300 of FIG. 4. FIG. 5 shows the case when the first reference voltage VREFH is higher than the maximum level of the data signal DATA, and the second reference voltage VREFL is lower than the minimum level of the data signal DATA. FIG. 6 shows the case when the first reference voltage VREFH is higher than the median level of the data signal DATA and lower than the maximum level of the data signal DATA, and the second reference voltage VREFL is lower than the median level of the data signal DATA and higher than the minimum level of the data signal DATA.

Referring to FIG. 5, the operation of the dual reference voltage receiving apparatus 300 of FIG. 4 will be explained.

When the clock signal CLK is low, the inner output signal V2 and the complementary signal V2' of the second input buffer 330, as well as the inner output signal V1 and the complementary signal V1' of the first input buffer 310, have the voltage of the power supply VDD.

When the data signal DATA is input to the dual reference voltage receiving apparatus 300, the voltage difference between the first reference voltage VREFH and the input data signal DATA is sensed and amplified by the first input buffer 310, and the voltage difference between the second reference voltage VREFL and the data signal DATA is sensed and amplified by the second input buffer 330 when the clock signal CLK is high.

First, when the data signal DATA is low in the CLK logic high periods P1 period, the voltage difference between the data signal DATA and the first reference voltage VREFH is large, whereas the voltage difference between the data signal DATA and the second reference voltage VREFL is small. Accordingly, the first input buffer 310 develops the data signal DATA at high speed and the second input buffer 330 develops the data signal DATA at low speed.

As a result, the inner output signal V2 of the second input buffer 330 reaches the same level as the median level of the inner output signal V1 of the first input buffer 310 a T time later. Accordingly, after approximately T time from when the first selection signal SEL1 first becomes logic high, the second selection signal SEL2 becomes logic high. Similarly, the first input buffer 310 and the second input buffer 330 function to change the voltage difference into the time difference T.

When the first selection signal SEL1 becomes logic high prior to the second selection signal SEL2, the output signal DI of the phase detector 350 becomes logic high at the time the output signal SEL1 becomes logic high.

Next, when the data signal DATA is high in the next clock signal CLK logic high period P2 period, the voltage difference between the data signal DATA and the first reference voltage VREFH is small, and the voltage difference is large between the data signal DATA and the second reference voltage VREFL. Accordingly, the first input buffer 310 develops the data signal DATA at low speed and the second input buffer 330 develops the data signal DATA at high speed.

As a result, the inner output signal V2 of the second input buffer 330 reaches the median level first and the inner output signal V1 of the first input buffer 310 reaches the same level T time later. Therefore, the second selection signal SEL2 becomes logic high first, and the first selection signal SEL1 becomes logic high approximately T time later.

When the second selection signal SEL2 become logic high prior to the first selection signal SEL1, the output signal DI of the phase detector 350 becomes logic low at the time the second selection signal SEL2 becomes logic high.

Thus, when the output signal DI of the phase detector 350 becomes logic high, the receiving apparatus of the semiconductor device perceives the data signal DATA as logic low. When tire output signal DI of the phase detector 350 becomes logic low, the receiving apparatus of the semiconductor device perceives the data signal DATA as logic high.

Another operation of the dual reference voltage receiving apparatus 300 of FIG. 4 is explained below.

Referring to FIG. 6, the first reference voltage VREFH is higher than the median level of the data signal DATA and lower than the maximum level of the data signal DATA, and the level of the second reference voltage VREFL is lower than the median level of the data signal DATA and higher than the minimum level of the data signal DATA. As a result, the complementary signal V2' of the inner output signal V2 of the second input buffer 330 becomes logic low, because the second reference voltage VREFL is lower than the minimum level of the data signal DATA in the period P1.

In this case, the processing speed of the second input buffer 330 is as high as that of the first input buffer 310 and, thus, the inner output signal V1 of the first input buffer 310 and the complementary signal V2' of the inner output signal V2 of the second input buffer 330 reach the same median level at almost the same time. In that case, the first selection signal SEL1 becomes logic high and the second selection signal SEL2 remains logic low, and the output signal DI of the phase detector 350 becomes logic low when the first selection signal SEL1 becomes logic high.

Because the first reference voltage VREFH is lower than the maximum level of the data signal DATA in the period P2, the complementary signal V1' of the inner output signal V1 of the first input buffer 310 becomes logic low.

In this case, the processing speed of the first input buffer 310 is as high as that of the second input buffer 330 and, thus, the inner output signal V2 of the second input buffer 330 and the complementary signal V1' of the inner output signal V1 of the first input buffer 310 reach the same median level at almost the same time. In that case, the second selection signal SEL2 becomes logic high and the first selection signal SEL1 remains logic low. As in FIG. 5, when the second selection signal SEL2 becomes logic high, the output signal DI of the phase detector 350 becomes logic low.

Referring to FIG. 4, the first input buffer 310 can make a better determination of low data by using a relatively high first reference voltage VREFH compared to using a single reference voltage, which has the median level of the data signal DATA, because a larger amount of electric current flows to the transistor N14 to which the first reference voltage VREFH is input.

Also, the second input buffer 330 can make a better determination of high data using a relatively low second reference voltage VREFL than using a single reference voltage, since a smaller amount of electric current flows to the transistor N33 to which the second reference voltage VREFL is input.

According to exemplary embodiments of the present invention, a single reference voltage receiving apparatus can perform the same operation as a dual reference voltage receiving apparatus. Therefore, the operation of a dual reference voltage receiving apparatus can be performed by producing an offset current that corresponds to the offset between the first reference voltage VREFH and the second reference voltage VREFL and that flows more in the first input buffer 310 and flows less in the second input buffer 330.

Figure 7:
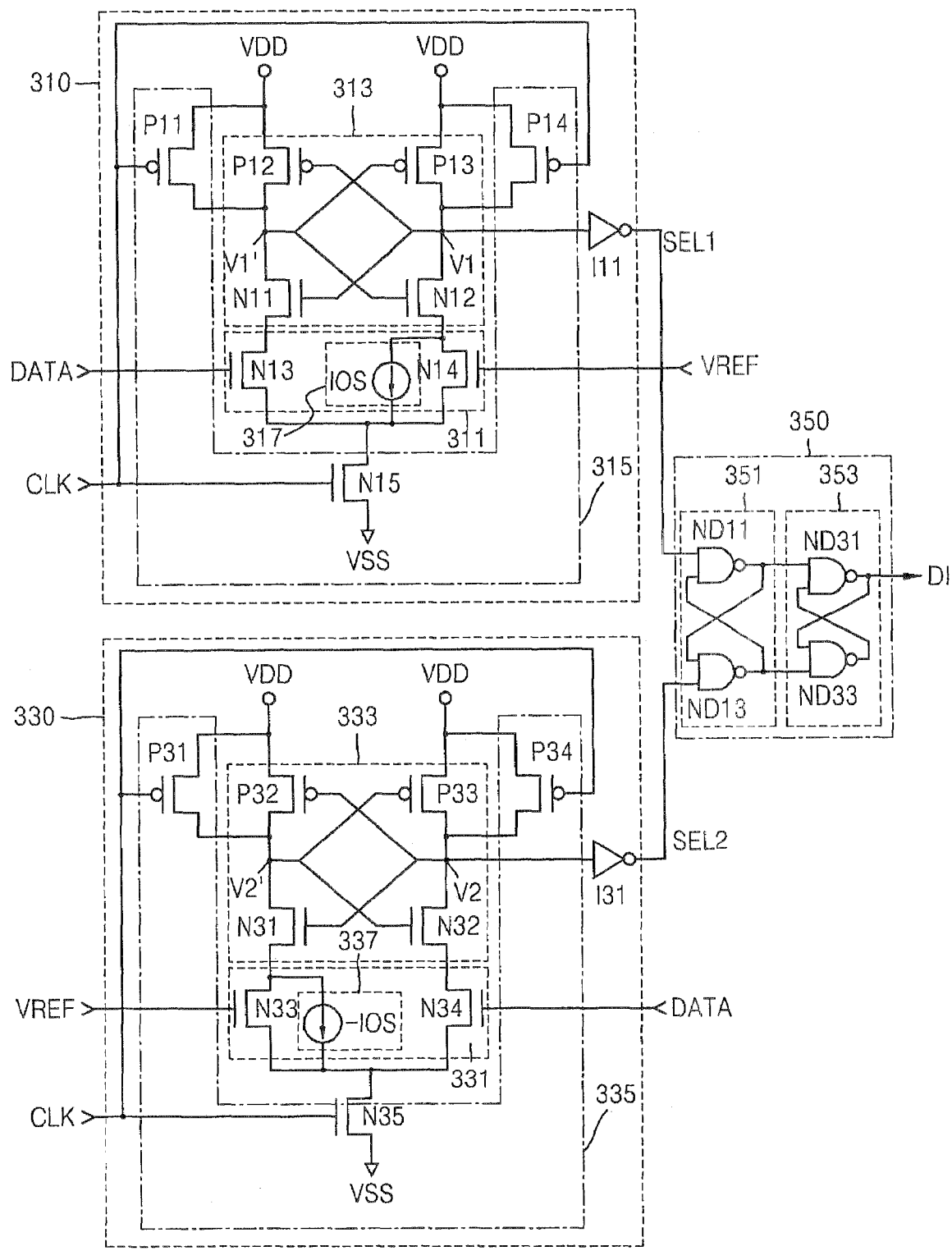
FIG. 7 is a circuit diagram of a semi-dual reference voltage receiving apparatus according to an exemplary embodiment of the present invention.

FIG. 7 is a circuit of a semi-dual reference voltage receiving apparatus 700 according to an exemplary embodiment of the present invention. Compared to the dual reference voltage receiving apparatus 300 of FIG. 4, first and second input buffers 310 and 330 in the semi-dual reference voltage receiving apparatus 700 according to this exemplary embodiment of the present invention further include first and second current offset controlling units 317 and 337, respectively, and the same reference voltage VREF is applied to the first and the second input buffers 310 and 330. The reference voltage VREF may be a predetermined voltage that can determine the voltage of a data signal DATA, and particularly may be the median level of the data signal DATA.

The specific structures and operations of the exemplary embodiments of the present invention are explained below, and descriptions of the same structures and operations as the dual reference voltage receiving apparatus 300 in FIG. 4 are omitted.

Referring to FIG. 7, the first input buffer 310 includes a first input receiving unit 311, a first sense amplifying unit 313, and a first current offset controlling unit 317, and can further include a first controlling unit 315. The first input receiving unit 311 includes a first input transistor N13 and a second input transistor N14. The data signal DATA is applied to the gate of the first input transistor N13 and the reference voltage VREF is applied to the gate of the second input transistor N14.

The first sense amplifying unit 313 senses and amplifies the voltage difference between the voltage of a first terminal of the first input transistor N13 and the voltage of a first terminal of the second input transistor N14. The first sense amplifying unit 313 may be a cross-coupled sense amplifier according to this exemplary embodiment of the present invention, but it will be understood by those of ordinary skill in the art that any other form of sense amplifier can be used in the present invention.

In this exemplary embodiment, the gate of the first input transistor N13 is the positive input terminal of the first input buffer 310 and the gate of the second input transistor N14 is the negative input terminal of the first input buffer 310.

The first current offset controlling unit 317 controls the offset of the electric current that flows through a second terminal of the second input transistor N14, and makes a larger amount of the electric current to flow through the second terminal of the second input transistor N14 than the case when the reference voltage VREF is applied to the gate of the second input transistor N14. Thus, the first input buffer 310 can make a better determination of the low data, and can perform the same operation as the case when the first reference voltage VREFH is input through the gate of the second input transistor N14 of the dual reference voltage receiving apparatus 300 of FIG. 4.

Also, the receiving apparatus 700 uses a first current source IOS that supplies a predetermined offset current to the second terminal of the second input transistor N14 as the first current offset controlling unit 317, but it will be understood by those of ordinary skill in the art that any other forms of current supply means can be used.

The first current source IOS can be connected in parallel to the second input transistor N14 as illustrated in FIG. 7.

Figure 8:
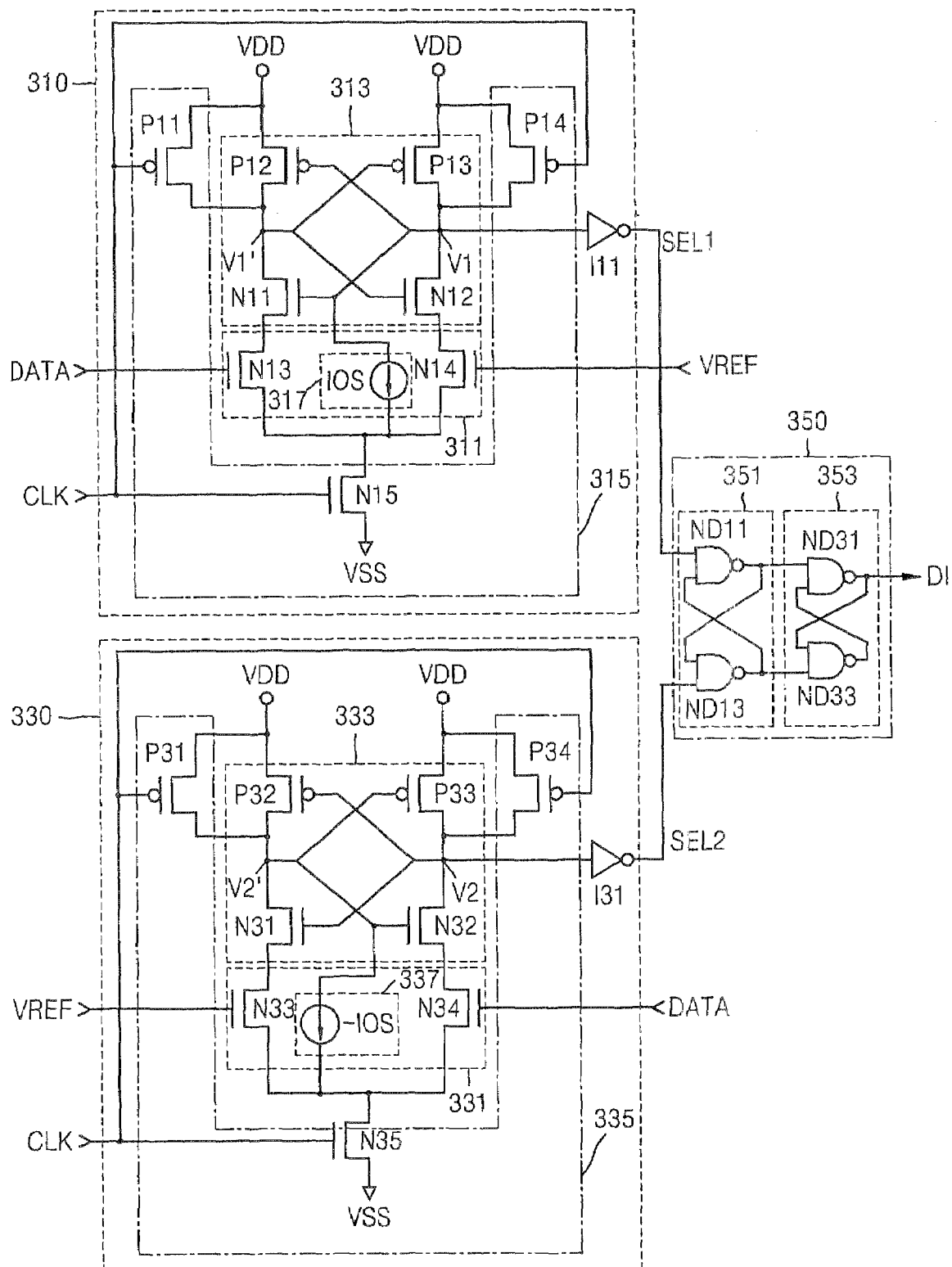
FIG. 8 is a circuit diagram of a semi-dual reference voltage receiving apparatus according to an exemplary embodiment of the present invention.

FIG. 8 is a circuit diagram of another semi-dual reference voltage receiving apparatus 800 according to an exemplary embodiment of the present invention. Referring to FIG. 8, the first current source IOS can be connected to the gate of the transistor N11 of the cross-coupled sense amplifier 313 that is connected to the first input transistor N13 and the second terminal of the second input transistor N14.

The first input buffer 310 can further include a first controlling unit 315 that enables or disables the first input receiving unit 311 and the first sense amplifying unit 313 in response to the clock signal CLK. The operation of the first controlling unit 315 is the same as that of the controlling unit 315 of the dual reference voltage receiving apparatus 300 of FIG. 4 and, thus, a detailed description thereof will be omitted.

The second input buffer 330 in the semi-dual reference voltage receiving apparatus 700 of FIG. 7 includes a second input receiving unit 331, a second sense amplifying unit 333, and a second current offset controlling unit 337, and can further include a second controlling unit 335. Since the operations of the second input receiving unit 331, the second sense amplifying unit 333, and the second controlling unit 335 can be fully understood from the operations of the first input receiving unit 311, the first sense amplifying unit 313, and the first controlling unit 315, hereinafter only the operation of the second current offset controlling unit 337 will be explained.

The operation of the second current offset controlling unit 337 also is similar to that of the first current offset controlling unit 317. Therefore, it will be seen that the second current offset controlling unit 337 also controls the offset of the electric current that flows through the second terminal of a third input transistor N33. According to this exemplary embodiment of the present invention, the second current offset controlling unit 337 makes a smaller amount of electric current that flows through the second terminal of the third input transistor N33 compared to the case when the reference voltage VREF is applied to the gate of the third input transistor N33. Therefore, the second input buffer 330 can make a better comparison of high data and, thus, can perform the same operation as the ease when the second reference voltage VREFL is applied to the gate of the third input transistor N33.

The semi-dual reference voltage receiving apparatus 700 according to this exemplary embodiment of the present invention uses a second current source –IOS that supplies a predetermined negative offset current to the second terminal of the second input transistor N14 as the second current offset controlling unit 337, but it is understood by those of ordinary skill in the art that other forms of current supply means can be used. In this case, the negative offset current that is supplied by the second current source IOS and the offset current that is supplied by the first current source IOS may be of opposite polarity and have the same absolute value.

Referring to FIG. 7, the second current source –IOS can be connected in parallel to the third input transistor N33. Referring to the semi-dual reference voltage receiving apparatus 800 of FIG. 8, the second current source –IOS can also be connected to a gate of a transistor N32 of a cross-coupled sense amplifier 333 that is connected to a fourth input transistor N13 and to the second terminal of the third input transistor N33.

The differences in structures and operations between the semi-dual reference voltage receiving apparatus 800 and the receiving apparatus 700 of FIG. 7 are explained above.

Figure 9:
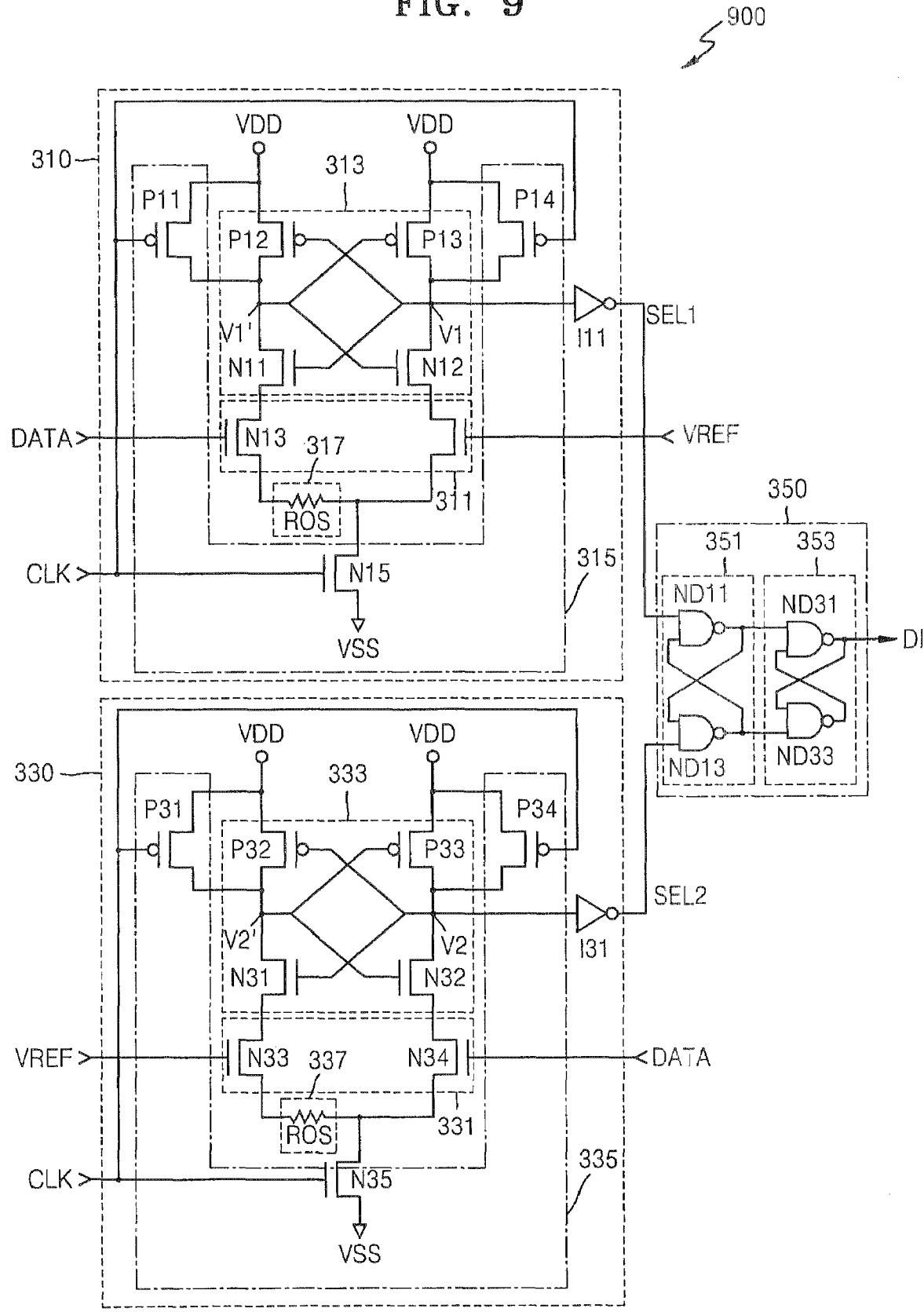
FIG. 9 is a circuit diagram of a semi-dual reference voltage receiving apparatus according to an exemplary embodiment of the present invention.
Figure 10:
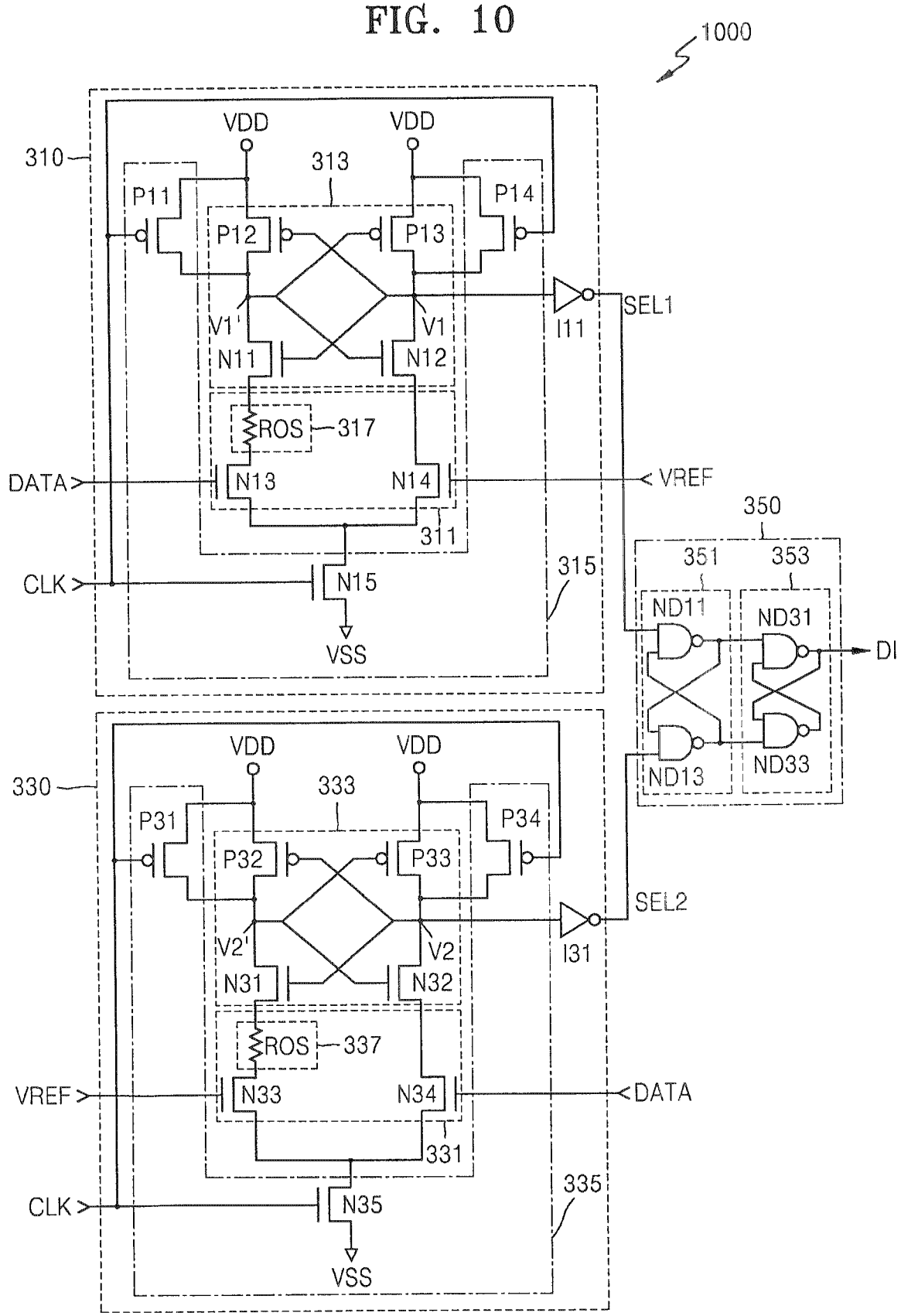
FIG. 10 is a circuit diagram of a semi-dual reference voltage receiving apparatus according to an exemplary embodiment of the present invention.

FIGS. 9 and 10 are circuits of other semi-dual reference voltage receiving apparatuses 900 and 1000 respectively, according to exemplary embodiments of the present invention. Hereinafter, the structures and operations of the semi-dual reference voltage receiving apparatuses 900 and 1000 of FIGS. 9 and 10 will be explained with reference to FIG. 9.

As explained above with reference to the dual reference voltage receiving apparatus 300 of FIG. 4, the exemplary embodiments of the present invention make electric current flow in a larger amount to the second input transistor N14 of the first input buffer 310, and in a smaller amount to the third input transistor N33 of the second input buffer 330, so that the semi-dual reference voltage receiving apparatus 700 can perform the same operation using a single reference voltage as the dual reference voltage receiving apparatus 300 of FIG. 4, which uses a dual reference voltage.

Using this mechanism, the same effect can he obtained by inhibiting the electric current flows to the first input transistor N13 instead of making a larger amount of electric current flow to the second input transistor N14. Similarly, the same effect can be obtained by inhibiting the electric current that flows to the third input transistor N33 instead of making a smaller amount of electric current flow to the third input transistor N33.

In exemplary embodiments of the present invention, the electric current that flows through the first input transistor N13 and the third input transistor N33 is controlled by connecting a resistor in series in the path of the electric current that flows through the first input transistor N13 and the third input transistor N33.

The semi-dual reference voltage receiving apparatuses 900 and 1000 of FIGS. 9 and 10, respectively, have the same structures as the semi-dual reference voltage receiving apparatuses 700 and 800 of FIGS. 7 and 8, respectively, except for the structures of the first and the second current offset controlling units 317 and 337. Therefore, the structures and operations of the first and the second current offset controlling units 317 and 337 will be explained with reference to FIGS. 9 and 10.

Referring to FIG. 9, the first current offset controlling unit 317 controls the offset of the electric current that flows through the second terminal of the first input transistor N13. Therefore, the offset of the electric current that flows through the second terminal of the first input transistor N13 is controlled by connecting a first resistor ROS in the path through which the electric current that flows through the first input transistor N13 flows to inhibit the current flow through the second terminal of the first input transistor N13.

The first resistor ROS can be connected in series to the second terminal of the first input transistor N13 as illustrated in FIG. 9. The first resistor ROS can also be connected in series to a first terminal of the first input transistor N13 as in the semi-dual reference voltage receiving apparatus 1000 illustrated in FIG. 10.

The second current offset controlling unit 337 controls the offset of the electric current that flows through the second terminal of the third input transistor N33 as the first current offset controlling unit 317 does. Therefore, the offset of the electric current that flows through the second terminal of the third input transistor N33 is controlled by connecting a second resistor ROS in the path through which the electric current that flows through the third input transistor N33 flows and, thus, inhibiting the current that flows through the second terminal of the third input transistor N33.

As illustrated in FIG. 9, the second resistor ROS can be connected in series to the second terminal of the third input transistor N33. The second resistor ROS can also be connected in series to the first terminal of the third input transistor N33 as in the semi-dual reference voltage receiving apparatus 1000 of FIG. 10. The first resistor ROS and the second resistor ROS may have the same resistance value.

Previously, the operation in which the first and the second input buffers 310 and 330 in the data receiving apparatus 300 receive differential signals was explained, however, it is understood by those of ordinary skill in the art that the first input buffer 310 or the second input buffer 330 can be used in semiconductor devices as a separate unit.

Also, the methods of making the receiving apparatus according to exemplary embodiments of the present invention perform the same operation as a dual reference voltage receiving apparatus by inhibiting electric current that flows through the first input transistor N13; increasing electric current that flows through the second input transistor N14; decreasing electric currents that flows through the third input transistor N33; or inhibiting electric current that flows through the third input transistor N33. The same effect may be obtained, however, by those of ordinary skill in the art using complementary methods other than the methods explained above without departing from the spirit and scope of the present invention.

As described above, the semi-dual reference voltage receiving apparatus according to exemplary embodiments of the present invention uses the same circuit as a dual reference voltage receiving apparatus but uses only a single reference voltage. Thus, the semi-dual reference voltage receiving apparatus according to exemplary embodiments of the present invention can reduce the amount of circuitry required and yet have all the advantages of a dual reference voltage receiving apparatus and, thus, can reduce manufacturing costs.

In addition, the semi-dual reference voltage receiving apparatus according to exemplary embodiments of the present invention has the same structure as a dual reference voltage receiving apparatus and, thus, can replace a dual reference voltage receiving apparatus without additional structural modification.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A receiving apparatus comprising:
    a first input buffer that senses and amplifies a voltage difference between a data signal that is input through a positive input terminal and a reference voltage that is input through a negative input terminal;
    a second input buffer that senses and amplifies a voltage difference between the reference voltage that is input through a positive input terminal and the data signal that is input through a negative input terminal; and
    a phase detector that detects a phase difference between first and second selection signals that are respectively output from the first input buffer and the second input buffer,
    wherein the first input buffer comprises:
        a first input receiving unit that comprises a first input transistor and a second input transistor, wherein the data signal is applied to a gate of the first input transistor and the reference voltage is applied to a gate of the second input transistor;
        a first sense amplifier that senses and amplifies the voltage difference between a voltage of a first terminal of the first input transistor and a voltage of a first terminal of the second input transistor;
        a first current offset controlling unit that controls an offset of an electric current that flows through a second terminal of the second input transistor, and
        wherein the gate of the first input transistor is the positive input terminal of the first input buffer and the gate of the second input transistor is the negative input terminal of the first input buffer.

2. The receiving apparatus of claim 1, wherein the first current offset controlling unit is a first current source that supplies a predetermined offset current to the second terminal of the second input transistor.

3. The receiving apparatus of claim 2, wherein the first current source is connected in parallel to the second input transistor.

4. The receiving apparatus of claim 2, wherein the first sense amplifier is a cross-coupled sense amplifier.

5. The receiving apparatus of claim 4, wherein the first current source is connected to a gate of a transistor of cross-coupled sense amplifier, which is connected to the first input transistor, and to the second terminal of the second input transistor.

6. The receiving apparatus of claim 1, wherein the reference voltage is a median level of the data signal.

7. The receiving apparatus of claim 1, wherein the first input buffer further comprises a first controlling unit that enables or disables the first input receiving unit and the first sense amplifier in response to a clock signal.

8. The receiving apparatus of claim 1, wherein the second input buffer comprises:
    a second input receiving unit that comprises a third transistor and a fourth input transistor, wherein the reference voltage is applied to a gate of the third transistor and the data signal is applied to a gate of the fourth input transistor;
    a second sense amplifier that senses and amplifies the voltage difference between a voltage of a first terminal of the third input transistor and a voltage of a first terminal of the fourth input transistor; and
    a second current offset controlling unit that controls an offset of electric current that flows to the third input transistor, and
    wherein the gate of the third input transistor is the positive input terminal of the second input buffer and the gate of the fourth input transistor is the negative input terminal of the second input buffer.

9. The receiving apparatus of claim 8, wherein the second current offset controlling unit is a second current source that supplies a minus offset current to a second terminal of the third input transistor.

10. The receiving apparatus of claim 9, wherein the second current source is connected in parallel to the third input transistor.

11. The receiving apparatus of claim 9, wherein the second sense amplifier is a cross-coupled sense amplifier.

12. The receiving apparatus of claim 11, wherein the second current source is connected to a gate of a transistor of the cross-coupled sense amplifier, which is connected to the fourth input transistor, and to the second terminal of the third input transistor.

13. The receiving apparatus of claim 8, wherein the second input buffer comprises a second controlling unit that enables or disables the second input receiving unit and the second sense amplifier in response to a clock signal.

14. A receiving apparatus comprising:
    a first input buffer that senses and amplifies a voltage difference between a data signal that is input through a positive input terminal and a reference voltage that is input through a negative input terminal;
    a second input buffer that senses and amplifies a voltage difference between the reference voltage that is input to a positive input terminal and the data signal that is input to a negative terminal; and
    a phase detector that detects a phase difference between first and the second selection signals that are output from the first input buffer and the second input buffer respectively,
    wherein the first input buffer comprises:
        a first input receiving unit that comprises a first input transistor and a second input transistor, wherein the data signal is applied to a gate of the first input transistor and the reference voltage is applied to a gate of the second input transistor;
        a first sense amplifier that senses and amplifies a voltage difference between a voltage of a first terminal of the first input transistor and a voltage of a first terminal of the second input transistor; and
        a first current offset controlling unit that controls an offset of an electric current that flows through a second terminal of the first input transistor,
            wherein the gate of the first input transistor is the positive input terminal of the first input buffer and the gate of the second input transistor is the negative input terminal of the first input buffer.

15. The receiving apparatus of claim 14, wherein the first current offset controlling unit is a first resistor that inhibits the electric current flowing through the second terminal of the first input transistor.

16. The receiving apparatus of claim 15, wherein the first resistor is connected in series to a first terminal of the first input transistor.

17. The receiving apparatus of claim 15, wherein the first resistor is connected in series to a second terminal of the first input transistor.

18. The receiving apparatus of claim 14, wherein the first sense amplifier is a cross-coupled sense amplifier.

19. The receiving apparatus of claim 14, wherein the reference voltage is a median level of the data signal.

20. The receiving apparatus of claim 14, wherein the first input buffer further comprises a first controlling unit that enables or disables the first input receiving unit and the first sense amplifier in response to a clock signal.

21. The receiving apparatus of claim 14, wherein the second input buffer comprises:
 a second input receiving unit that comprises a third input transistor and a fourth input transistor, wherein the reference voltage is applied to a gate of a third input transistor and the data signal is applied to a gate of a fourth input transistor;
 a second sense amplifier that senses and amplifies a voltage difference between a voltage of a first terminal of the third input transistor and a voltage of a first terminal of the fourth input transistor; and
 a second current offset controlling unit that controls an offset of an electric current that flows to the third input transistor,
 wherein the gate of the third input transistor is the positive input terminal of the second input buffer and the gate of the fourth input transistor is the negative input terminal of the second input buffer.

22. The receiving apparatus of claim 21, wherein the second current offset controlling unit is a second resistor that inhibits the electric current flowing through the second terminal of the third input transistor.

23. The receiving apparatus of claim 22, wherein the second resistor is connected in series to a first terminal of the third input transistor.

24. The receiving apparatus of claim 22, wherein the second resistor is connected in series to a second terminal of the third input transistor.

25. The receiving apparatus of claim 21, wherein the second sense amplifier is a cross-coupled sense amplifier.

26. The receiving apparatus of claim 21, wherein the second input buffer further comprises a second controlling unit that enables or disables the second input receiving unit and the second sense amplifier in response to a clock signal.

* * * * *

UNITED STATES PATENT AND TRADEMARK OFFICE
CERTIFICATE OF CORRECTION

PATENT NO. : 7,518,411 B2
APPLICATION NO. : 11/747685
DATED : April 14, 2009
INVENTOR(S) : Kim et al.

It is certified that error appears in the above-identified patent and that said Letters Patent is hereby corrected as shown below:

Title page, item (30) Foreign Application Priority Data insert

--August 9, 2006 (KR) .............................10-2006-0075325--

Signed and Sealed this

Ninth Day of June, 2009

JOHN DOLL
*Acting Director of the United States Patent and Trademark Office*